(12) United States Patent
Mulligan et al.

(10) Patent No.: US 8,678,671 B2
(45) Date of Patent: Mar. 25, 2014

(54) OPTICAL FIBER TOOL

(75) Inventors: Paul M. Mulligan, Yorkville, IL (US); Carl Lindenmeyer, Bristol, IL (US); Stephen Migo, Woodridge, IL (US); Thomas R. Marrapode, Naperville, IL (US)

(73) Assignee: Molex Incorporated, Lisle, IL (US)

( * ) Notice: Subject to any disclaimer, the term of this patent is extended or adjusted under 35 U.S.C. 154(b) by 710 days.

(21) Appl. No.: 12/918,871

(22) PCT Filed: Feb. 23, 2009

(86) PCT No.: PCT/US2009/034909
§ 371 (c)(1),
(2), (4) Date: Dec. 23, 2010

(87) PCT Pub. No.: WO2009/105770
PCT Pub. Date: Aug. 27, 2009

(65) Prior Publication Data
US 2011/0126414 A1 Jun. 2, 2011

Related U.S. Application Data

(60) Provisional application No. 61/066,769, filed on Feb. 22, 2008.

(51) Int. Cl.
*G02B 6/36* (2006.01)
(52) U.S. Cl.
USPC .............. 385/85; 83/913; 81/9.43; 81/9.44; 385/134; 385/147
(58) Field of Classification Search
None
See application file for complete search history.

(56) References Cited

U.S. PATENT DOCUMENTS

| 5,046,252 A * | 9/1991 | Ayuta et al. ............ 30/258 |
| 6,230,387 B1 * | 5/2001 | Gritters et al. ............ 29/566.4 |
| 2004/0035280 A1 | 2/2004 | Poisel et al. |

FOREIGN PATENT DOCUMENTS

| EP | 1061387 | 12/2000 |
| JP | H10-307213 | 11/1998 |

OTHER PUBLICATIONS

International Search Report and Written Opinion of PCT Patent Application No. PCT/US2009/0034909. Oct. 6, 2009.

* cited by examiner

*Primary Examiner* — Uyen Chau N Le
*Assistant Examiner* — Chad Smith
(74) *Attorney, Agent, or Firm* — Timothy M. Morella

(57) ABSTRACT

A tool for cleaving a plastic optical fiber has a body with a cleaving aperture at the insertion face of the body and through which the termination end section of the plastic optical fiber is inserted and in which an operative section is positioned upon inserting the plastic optical fiber into the tool. A cutting blade has a cutting edge and is moveable along a cutting path between a first operative position at which the cutting edge is spaced from the cleaving axis and a second operative position at which the cutting edge intersects the cleaving axis to cleave the plastic optical fiber to create an optical finish on an end surface of the operative section of the plastic optical fiber. A clearance region is located at the termination face of the body and generally aligned with the cleaving aperture and in which the termination end section may deflect upon engagement of the cutting blade with the plastic optical fiber.

31 Claims, 10 Drawing Sheets

OPTICAL FIBER TOOL

REFERENCE TO RELATED APPLICATIONS

The Present Application represents a National Phase filing of PCT Patent Application No. PCT/US2009/0034909, entitled "Optical Fiber Tool," and filed with the United States Patent and Trademark Office (USPTO) as Receiving Office for the Patent Cooperation Treaty on 23 Feb. 2009. Further, the Present Application claims priority to U.S. Provisional Application No. 61/066,769, entitled "Optical Fiber Tool," and filed 22 Feb. 2008 with the USPTO. The contents of both the PCT and the Provisional Applications are fully incorporated in their entireties herein.

BACKGROUND OF THE PRESENT APPLICATION

The Present Application relates to a termination tool for optical fibers and, more specifically, a manually manipulatable tool for processing plastic optical fiber.

In recent years, plastic optical fiber ("POF") has become more widely accepted for various applications. This is due to the relatively low overall system cost as compared to glass optical fiber and its ease of installation as compared to copper twisted pair transmission lines. In some applications, POF may be utilized without the need for polishing the ends thereof, but POF could be more widely adopted if the quality of the finishing of the ends is improved. Such non-polished applications are possible if the terminated end of the POF is sufficiently smooth and flat so that minimal signal loss occurs between mating connectors. In general, it is desirable to obtain an end surface which results in a loss of less than 1 dB.

Terminating POF has been further complicated by the need to perform such terminations in the field. In the past, tools have been provided for such field termination, but they have generally required either multiple tools or relatively expensive, complex tools or manual hand polishing with costly films. Such prior art tools typically apply an axial compressive or tensile force prior to such termination and thus must securely and precisely hold the POF in place. Accordingly, field termination of POF in the past has required a substantial number of tools. If any one of these tools is lost, such field termination is not possible. The relatively expensive and complex "all-in-one" hand tools of the prior art, while adequately performing the field termination function, are sufficiently complicated and expensive so as to discourage widespread deployment in the field.

In general, the complexity and cost of the termination has been proportional to the resultant quality of the termination. For example, in one study, POF cut with: 1) an edge cutter was found to have a loss of approximately 4.2 dB; 2) a pocket knife was found to have a loss of approximately 2.8 dB; 3) a POF razor blade cutter was found to have a loss of approximately 1.3 dB; 4) a tool and the end with a coarsely polished end was found to have a loss of approximately 0.6 dB; and 5) a tool and the end with a finely polished end was found to have a loss of approximately 0.4 dB.

SUMMARY OF THE PRESENT APPLICATION

It is an object to solve the above-described problems encountered by the existing field termination tools and techniques by providing a simple, low-cost field termination tool for use with POF. Accordingly, a field termination tool is provided that performs each of the necessary functions for field terminating a POF connector.

A tool for cleaving a plastic optical fiber, which includes an operative section and a termination end section, has a body with an insertion face and a termination face opposite the termination face. A cleaving port has a cleaving aperture at the insertion face of the body and through which the termination end section of the plastic optical fiber is inserted and in which the operative section is positioned upon inserting the plastic optical fiber into the tool. The operative section of the plastic optical fiber in the tool defines a cleaving axis. A cutting blade has a cutting edge and is moveable along a cutting path between a first operative position at which the cutting edge is spaced from the cleaving axis and a second operative position at which the cutting edge intersects the cleaving axis to cleave the plastic optical fiber inserted into the cleaving aperture at a location between the operative section and the termination end section in order to cut the plastic optical fiber and create an optical finish on an end surface of the operative section of the plastic optical fiber. A clearance region is located at the termination face of the body and generally aligned with the cleaving aperture. The termination end section of the plastic optical fiber is inserted into the clearance region upon inserting the plastic optical fiber into the tool. The clearance region defines an open space intersecting with the cleaving axis and a deflection space into which the termination end section may deflect upon engagement of the cutting blade with the plastic optical fiber.

If desired, the tool may be a manually manipulatable hand tool and the cutting blade may have a chisel cut cutting edge. The cleaving aperture may extends through the insertion face and along the cleaving axis and the operative section of the plastic optical fiber may be located within a ferrule of a connector and the cleaving aperture may be configured to receive the ferrule therein. The tool may include a locating projection extending from the tool adjacent the cleaving port for engaging a portion of the connector in order to properly position the connector along the cleaving axis prior to cleaving. The cleaving aperture may extend through the locating projection and the locating projection may be configured to engage a mating portion of the connector. A pair of cleaving ports may be provided and the locating projections of each cleaving port may be interconnected.

If desired, the body may be generally elongated and have a longitudinal axis. The cutting blade may be generally planar and mounted to a moveable, elongated arm extending generally parallel to the longitudinal axis of the body. The cutting path may be planar and the arm may be rotatably mounted on the body and arm may rotate with the cutting blade in order to move the cutting blade from the first operative position to the second operative position along a cutting plane. The arm may include a support member for positioning the cutting blade at a desired, predetermined angle relative to the cutting path. The cutting blade may be coplanar with the cutting plane. The predetermined angle may be approximately 6 degrees with an upper surface of the cutting blade tilted away from the insertion face. A plurality of cleaving ports may be spaced lengthwise along the body and each of the cleaving port may include a bore through the insertion face and the bores of some of the cleaving ports may be identically sized.

If desired, the plastic optical fiber may have a predetermined diameter and the cleaving aperture may include a bore through the insertion face and along the cleaving axis. The bore may be larger than the outer diameter of the plastic optical fiber but not exceed 5% of such plastic optical fiber outer diameter. The clearance region may permit the termination end section of the plastic optical fiber to deflect at least approximately 10 degrees from the cleaving axis during the process of cleaving the plastic optical fiber.

If desired, the cutting blade may include a honed cutting surface. Such cutting surface may be honed so that no visible defects are present under approximately 100× magnification and possibly under approximately 50× magnification.

A manually manipulatable hand tool for a plastic optical fiber may be provided. The plastic optical fiber includes a diameter, an operative section and a termination end section. The tool includes an elongated body defining a longitudinal axis and having first and second sidewalls. A central elongated blade receiving recess is located between the sidewalls and at least one cleaving aperture extends through the first sidewall. The termination end section of the plastic optical fiber is inserted through the cleaving aperture and the operative section is positioned therein upon inserting the plastic optical fiber into the tool. The operative section of the plastic optical fiber in the tool defines a cleaving axis. A clearance region in the second sidewall is generally aligned with the cleaving aperture and includes an open space intersecting with the cleaving axis and a deflection space into which the termination end section may deflect. The termination end section of the plastic optical fiber is positioned in the clearance region upon insertion of the plastic optical fiber into the tool. A cutting arm has a blade operatively connected thereto and is mounted on the body for movement between a first operative open position at which plastic optical fiber may be inserted into the cleaving aperture and a second operative closed position at which the blade is positioned within the recess and extends across the cleaving aperture so that the plastic optical fiber inserted into the bore is cleaved between the operative section and the termination end section to create a finished optical surface on an end of the operative section in response to moving the cutting arm from the first operative open position to the second operative closed position.

If desired, at least one mating projection may extend from the first sidewall for mating with a mating face of a connector to accurately position an operative section of the plastic optical fiber positioned in the cleaving aperture. The cutting arm may be rotatably mounted on the body. A cutting section may be provided with an oval-shaped aperture extending generally perpendicular to the longitudinal axis and through the first and second sidewalls. The blade receiving recess may extend across the aperture to cut simultaneously two plastic optical fibers in response to movement of the cutting arm from its first operative open position to its second operative closed position. If desired, a splitting section may be provided for splitting a pair of plastic optical fibers connected by a web of insulative material in response to movement of the cutting arm from its first operative open position to its second operative closed position. The splitting section may include an oval shaped channel extending generally parallel to the longitudinal axis.

If desired, a stripping section may be provided for stripping an outer jacket from a plastic optical fiber in response to movement of the cutting arm from its first operative open position to its second operative closed position. The stripping section may include an aperture extending generally perpendicular to the longitudinal axis and through the first and second sidewalls. The cutting blade may extend only partially across the hole when the cutting arm is in the second operative closed position to cut only the outer jacket of the plastic optical fiber. If desired, a press arm may be mounted on the body for movement between first and second operative positions. The press arm may include a press section for securing a portion of the plastic optical fiber to the connector. The cutting arm and the press arm may both be rotatably mounted on the body. The arms may be mounted at opposite ends of the body.

A method of cleaving a plastic optical fiber may also be included in which a plastic optical fiber has a diameter, an operative section and a termination end section is provided. A tool having a cutting blade thereon configured for movement along a cutting path between first and second operative positions is also provided. The operative section of the plastic optical fiber is secured within an aperture no greater than 5% larger than the diameter of the plastic optical fiber and along a cleaving axis. The termination end section is positioned within a clearance region. The clearance region defining an open space along the cleaving axis and a deflection space adjacent the open space. The cutting blade is moved from the first operative position spaced from the cleaving axis to the second operative position intersecting the cleaving axis to engage the plastic optical fiber between the operative section and the termination end section and move the termination end away from the cleaving axis and into the defection space to cleave the plastic optical fiber and create an optical finish on an end surface of the operative section of the plastic optical fiber.

If desired, the termination end may move at least approximately 10 degrees away from the cleaving axis and into the deflection space. A connector having a mating face and a ferrule with the aperture may be provided. The termination end section of the plastic optical fiber may be inserted into the connector through the ferrule to an operative position such that the operative section of the plastic optical fiber is positioned within the ferrule and the termination end section of the plastic optical fiber extends from the ferrule. The positioning step may further include engaging the mating face of the connector with the tool such that an end portion of the ferrule is positioned immediately adjacent the cutting path.

If desired, a method of cleaving a plastic optical fiber may be performed. A duplex plastic optical fiber including first and second plastic optical fibers may be provided with each plastic optical fiber having a diameter, an operative section and a termination end section. A tool may be provided having a cutting blade thereon configured for movement along a cutting path between first and second operative positions. The duplex plastic optical fiber may be cut to a predetermined length. An outer buffer layer of the plastic optical fiber may be stripped. A connector may be provided having a mating face and first and second ferrules, with each ferrule including an aperture. The termination end section of the first and second plastic optical fibers may be inserted into the connector through the first and second ferrules to an operative position such that the operative section of each plastic optical fiber is positioned within its ferrule and the termination end section of each plastic optical fiber extends from its ferrule. The operative sections of the plastic optical fiber may be secured within the ferrules with each operative section being positioned along a cleaving axis. The connector may be positioned relative to the tool such that ends of the ferrules are adjacent the cutting path and the termination end sections are within a clearance region of the tool. The clearance region defining an open space along each respective cleaving axis and a deflection space adjacent the open space. The cutting blade may be moved from the first operative position spaced from the cleaving axes to the second operative position intersecting the cleaving axes to engage the plastic optical fiber to cleave the plastic optical fibers adjacent the ends of the ferrules and create an optical finish on an end surface of the operative sections of the plastic optical fibers.

If desired, the step of cutting the duplex plastic optical fiber to a predetermined length may includes inserting the duplex plastic optical fiber into a first oval shaped hole in the tool and moving the cutting blade from the first operative position to the second operative position. The step of cutting the web of material of the duplex plastic optical fiber to separate the individual plastic optical fibers may include inserting the duplex plastic optical fiber into a second oval shaped hole in the tool and moving the cutting blade from the first operative position to the second operative position. The step of stripping the outer buffer layer of the plastic optical fiber may include inserting the operative section and the termination end section of the first plastic optical fiber into a stripping hole in the tool and moving the cutting blade from the first operative position to the second operative position and rotating the plastic optical fiber.

BRIEF DESCRIPTION OF THE FIGURES

The organization and manner of the structure and operation of the Present Application, together with further objects and advantages thereof, may best be understood by reference to the following Detailed Description, taken in connection with the accompanying Figures, wherein like reference numerals identify like elements, and in which:

FIG. 10 is a cross-section of the hand tool of FIG. 1 taken generally along Line 10-10 of FIG. 1, illustrating the interaction between the cutting blade and the stripping aperture;

DESCRIPTION OF THE PREFERRED EMBODIMENTS

While the Present Application may be susceptible to embodiment in different forms, there is shown in the Figures, and will be described herein in detail, specific embodiments, with the understanding that the disclosure is to be considered an exemplification of the principles of the Present Application, and is not intended to limit the Present Application to that as illustrated.

In the illustrated embodiments, directional representations—i.e., up, down, left, right, front, rear and the like, used for explaining the structure and movement of the various elements of the Present Application, are relative. These representations are appropriate when the elements are in the position shown in the Figures. If the description of the position of the elements changes, however, it is assumed that these representations are to be changed accordingly.

Figure 13:
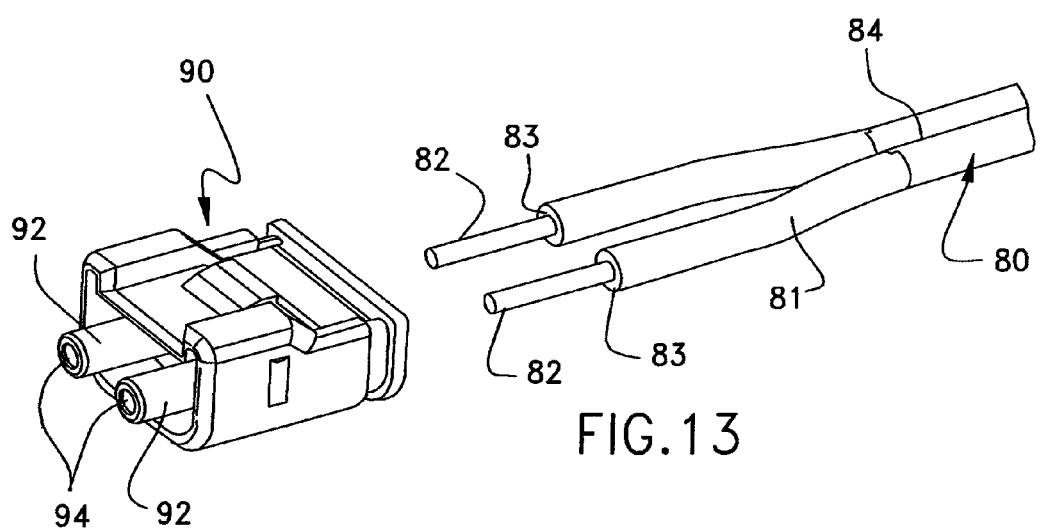
FIG. 13 is a perspective view of a connector and its associated duplex POF cables prior to termination.

Referring to FIG. 13, a duplex POF cable 80 includes a pair of plastic optical fibers 81, each having a center plastic optical fiber element 82 surrounded by a plastic jacket material 83 and interconnected by a web 84 of insulative material. FIG. 13 depicts the end of POF cable 80 in which the web 84 has been removed from a length of the cable and a shorter length of POF 82 in which the jacket 83 has been removed to facilitate termination of the duplex POF cable 80.

Figure 11:
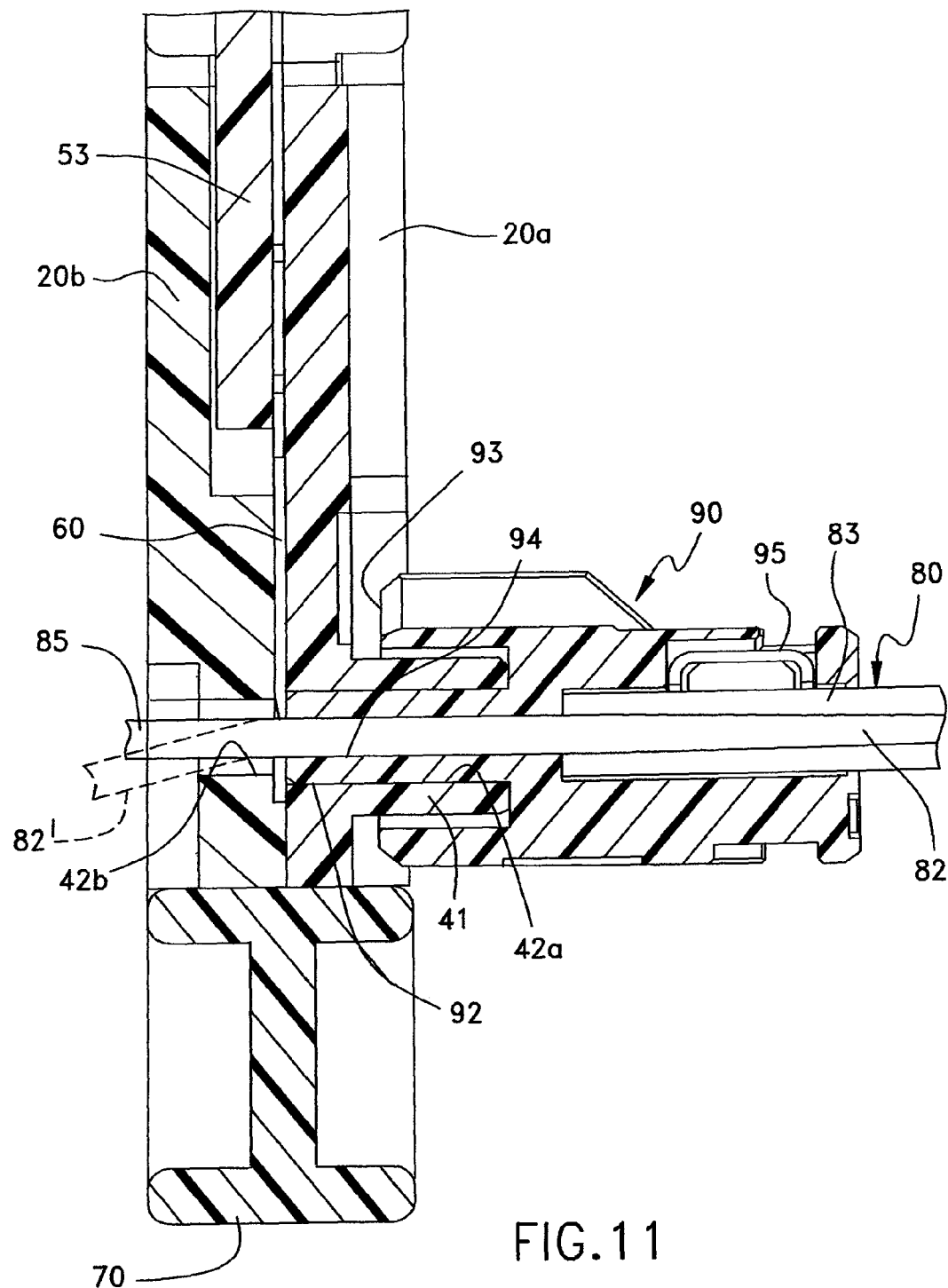
FIG. 11 is an end view similar to the cross-section of FIG. 8, but with the connector and POF loaded therein immediately prior to cleaving of the POF.
Figure 14:
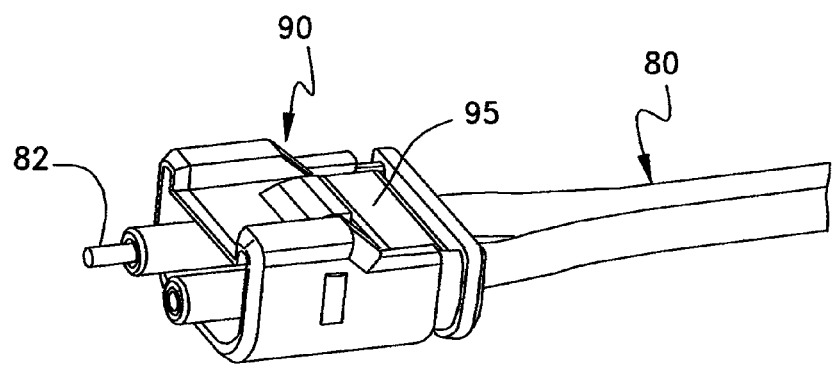
FIG. 14 is a perspective view of a connector with a duplex POF cable secured therein with one POF having been cleaved and the other prior to cleaving.

Connector 90 as depicted in FIGS. 13-14 is an "SMI" type connector though other types of connectors can be used with hand tool 15. Connector 90 has a one-piece integrally formed body 91 made of a synthetic resin such as PBT with an internal structure shaped to receive the end of the duplex POF cable 80 prepared as shown in FIG. 13. Body 91 has a pair of tubular or cylindrical projections 92 extending past a mating face or end thereof (FIG. 11). Projections 92 have a central bore 94 therethrough that is dimensioned to receive a length of the bare POF 82 therein. Accordingly, such projections 92 are similar to ferrules used with glass optical fiber and are referred to herein as ferrules. A locking clip or stopper 95 is insertable into a cavity in body 91 in order to engage the jacket portion of the POF cable 80 in order to secure cable 80 within connector 90.

Figure 1:
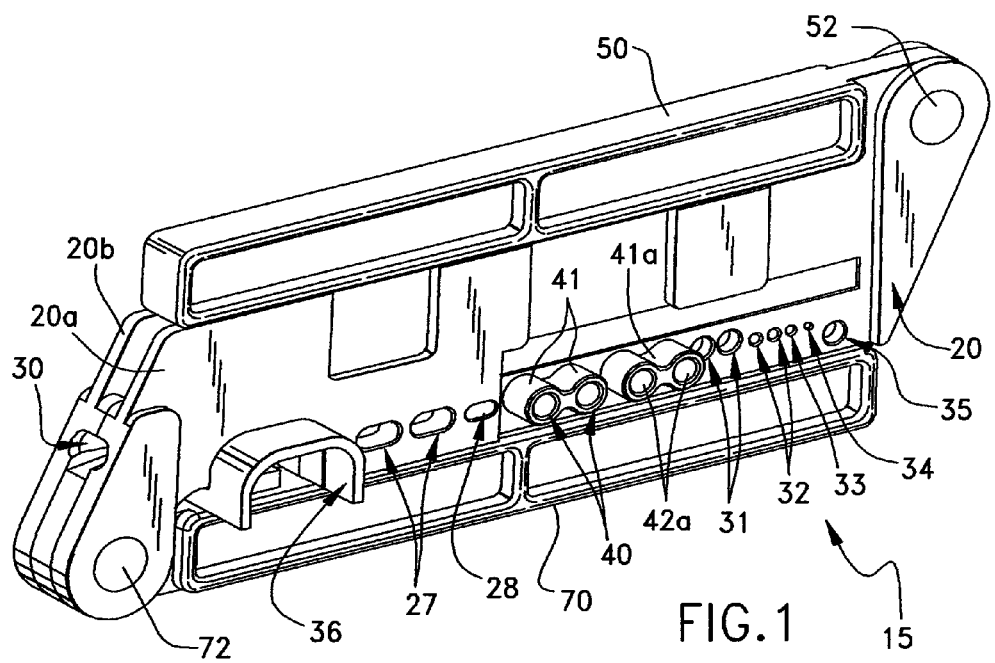
FIG. 1 is a perspective view of the hand tool in accordance with an embodiment of the Present Application.
Figure 2:
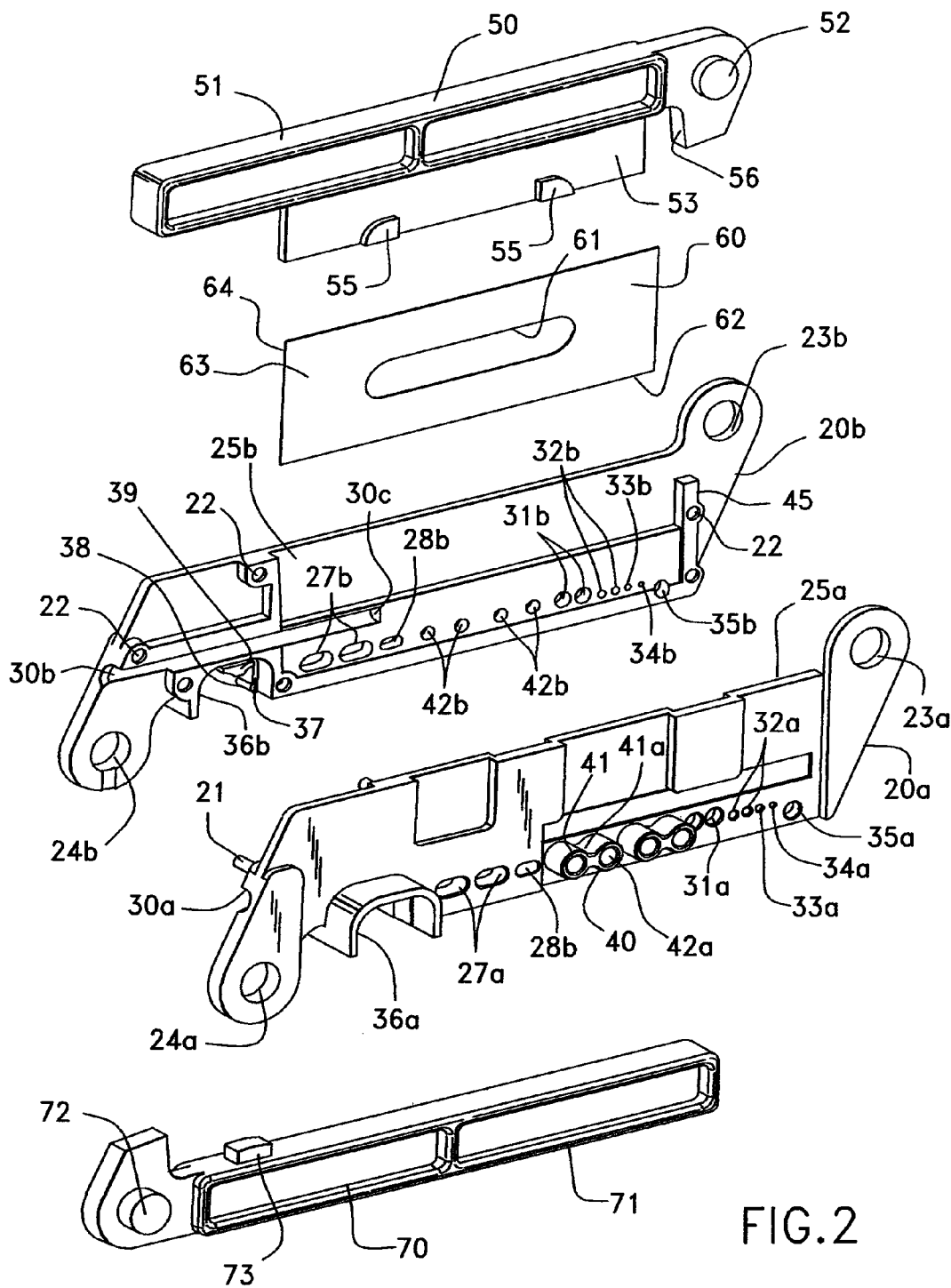
FIG. 2 is an exploded view of the hand tool of FIG. 1.

Referring to FIGS. 1-2, hand tool 15 for terminating POF cable 80 and connector 90 includes body 20 formed of two elongated halves, front body half 20a and rear body half 20b, that are secured together through pins 21 extending from front body half 20a and are inserted into holes 22 in rear body half 21b. Blade carrier arm 50 is rotatably mounted on body 20 and carries blade 60 thereon. Press arm 70 is rotatably mounted on body 20 but on a surface opposite that on which blade carrier 50 is mounted. Each of the body halves 20a, 20b, blade carrier arm 50 and press arm 70 are integrally formed as one-piece members of a synthetic resin such as PA 6-6 although other materials such as PBT and the like as well as multiple piece constructions could be used.

Both front body half 20a and rear body half 20b includes a pair of upper circular apertures or bores 23a and 23b, respectively, whose axes are co-linear when the two body halves are interconnected and together define a rotational surface about which blade carrier arm 50 may rotate. Similarly, front body half 20a and rear body half 20b also include lower circular apertures or bores 24a and 24b, respectively, whose axes are co-linear when the two body halves are interconnected and together define a rotational surface about which press arm 70 may rotate. In addition, each body half 20a, 20b includes a recess 25a, 25b, respectively, along their inner surface that combine to form a slot 25 in which cutting blade 60 is positioned. In other words, cutting blade 60 is movably positioned between front body half 20 and rear body half 20b within slot 25.

Each of the body halves 20a, 20b includes a series of holes or apertures of various shapes and sizes that serve a variety of functions during the connector termination process and all but one are positioned generally perpendicular to the longitudinal axis of tool 15. Each body half has a pair of relatively large oval-shaped cutting ports 27 and a single smaller oval-shaped cutting port 28. These ports are dimensioned so that a duplex POF cable 80 may be inserted therethrough in order to facilitate cutting the duplex cable to the desired length. The larger ports 27 are dimensioned to receive a duplex POF cable 80 in which the diameter of the plastic jacket 83 surrounding the inner plastic fiber 82 is nominally 2.2 mm and the diameter of the inner plastic fiber 82 is nominally 1.0 mm. The smaller port 28 is dimensioned to receive a duplex POF cable 80 in which the diameter of the plastic jacket surrounding the inner plastic fiber is nominally 1.5 mm and the inner plastic fiber 82 is nominally 1.0 mm. Two larger ports are provided because it is expected that the larger ports 27 will be used more frequently than the smaller port 28. Each cutting port 27 is defined by a front oval-shaped aperture 27a on front body half 20a and a similarly or identically shaped and dimensioned rear oval-shaped aperture 27b on rear body half 20b that are aligned when the two body halves are connected. Cutting port 28 is formed in the same manner as cutting ports 27 but has different dimensions.

Each body half 20a, 20b includes an elongated channel-like recess 30a, 30b, respectively, that extends along the longitudinal axis of hand tool 15 from the left hand side (as viewed in FIGS. 1 and 2) and towards the center of body 20 as best seen in FIG. 2. When the two body halves are connected, the two recesses 30a, 30b combine to form an oval channel 30 into which a duplex cable may be inserted in order to utilize cutting blade 60 to split the web 83 between the POF cables 81.

Front body half further includes a plurality cleaving or termination ports along a section thereof. Two cleaving ports 31 of a first size, two cleaving ports 32 of a second smaller size, one cleaving port 33 of a still smaller size and an additional cleaving port 34 of an even smaller size are provided with the multiple ports being associated with sizes that will be used most frequently.

Each of the cleaving ports 31, 32, 33, 34 includes an aperture or bore 31a, 32a, 33a, 34a through front housing half 20a and a slightly larger sized aperture or bore 31b, 32b, 33b, 34b through rear housing half 20b aligned with the associated aperture of the front housing half 20a. Apertures 31a, 32a, 33a, 34a are sized so as to have a slightly larger diameter than the diameter of the POF to be inserted therein and cleaved within such port. It is desirable that the apertures of the front housing half each have a diameter that ranges from the diameter of the POF to be inserted therein to a diameter five percent (5%) larger than that of the POF.

Apertures 31b, 32b, 33b and 34b are sized so as to be large enough to permit the movement of the length of POF inserted into its respective port during the cleaving process. For example, in one embodiment, each aperture preferably has a diameter that is two times (2×) larger than the diameter of the POF to be cleaved in that particular port. The dimension of the aperture is also a function of the thickness of the rear housing half 20b and should be large enough to allow the POF to deflect in an unimpeded manner. It is not necessary that the rear housing half apertures be circular and could, for example, be oval-shaped with the elongation being vertical or generally along the path of travel of cutting blade 60. Furthermore, the rear housing half apertures 31b, 32b, 33b, 34b do not need to extend above an upper surface of the front housing half apertures 31a, 32a, 33a, 34a, respectively, as long as such rear housing half apertures are enlarged to provide adequate clearance and permit downward movement of the POF during cleaving. Accordingly, it is possible to enlarge or eliminate portions of the rear housing half 20b to create the desired clearance. However, this may be undesirable as the rear housing half 20b with the apertures can be used to protect a user's fingers from cutting blade 60.

During the cleaving process, cutting blade 60 will engage the POF at a location immediately adjacent the inner edge of front housing half 20a and be supported by and within apertures 31a, 32a, 33a, 34a. Such engagement of the cutting blade 60 with the POF will force the free end of the POF within rear housing half apertures 31b, 32b, 33b, 34b to move downward during the cleaving process. It is desirable that the free end of the POF be permitted to rotate or deflect downward out of the axis of the front housing apertures by at least 10 degrees although rotation or deflection of a lesser amount may be acceptable provided that rotation or deflection of the POF is not significantly impeded.

The aligned apertures, for example 31a and 31b, form a cleaving port when the front housing half 20a is interconnected to the rear housing half 20b so that individual plastic optical fibers may be inserted therein order to carry out the cleaving process. The multiple sized cleaving ports 31, 32, 33, 34 are included in order to provide a user with the flexibility to cut POF of different diameters. Two ports are provided at each of the larger sizes as it is expected that POF of those diameters will be cleaved more frequently than POF of the smaller diameters.

Although cleaving ports 31, 32, 33, 34 are provided with front housing apertures 31a, 32a, 33a, 34a that are smaller in size than rear housing apertures 31b, 32b, 33b, 34b, respectively, to facilitate the cleaving process (i.e., to create an acceptable optical finish), the respective pairs of apertures (e.g., 31a, 31b) could be sized identically. Such identical sizing as well as enlargement of front housing apertures 31a, 32a, 33a, 34a would still permit cutting blade 60 to cut a length of POF inserted into ports 31, 32, 33, 34 but such cuts would not result in an end of the POF that has the desired, acceptable optical finish. In addition to creating an optical finish, ports 31, 32, 33, 34 as depicted can be used to cut a length of POF regardless of the desired endsurface of the POF. In other words, by providing the ports as depicted, such ports can have a dual purpose of cleaving to create an optical finish or merely cutting the POF to a desired length (although the end will still have an optical finish). In the alternative, the apertures could be the same size but then they would only function to roughly cut the POF.

Figure 3:
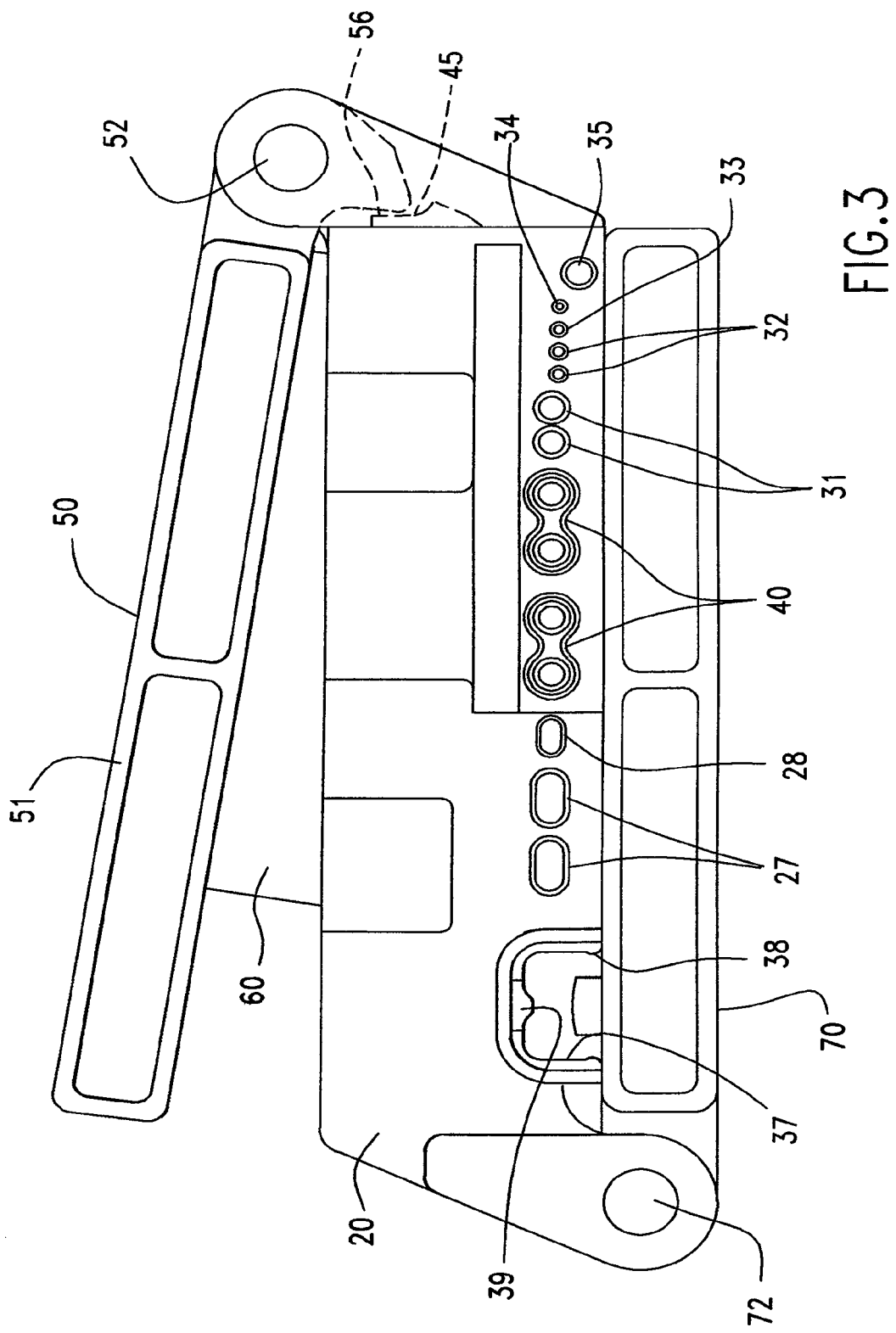
FIG. 3 is a front view of the hand tool of FIG. 1 with the cutting arm positioned in the open position to facilitate insertion of the POF into the body of the hand tool.
Figure 5:
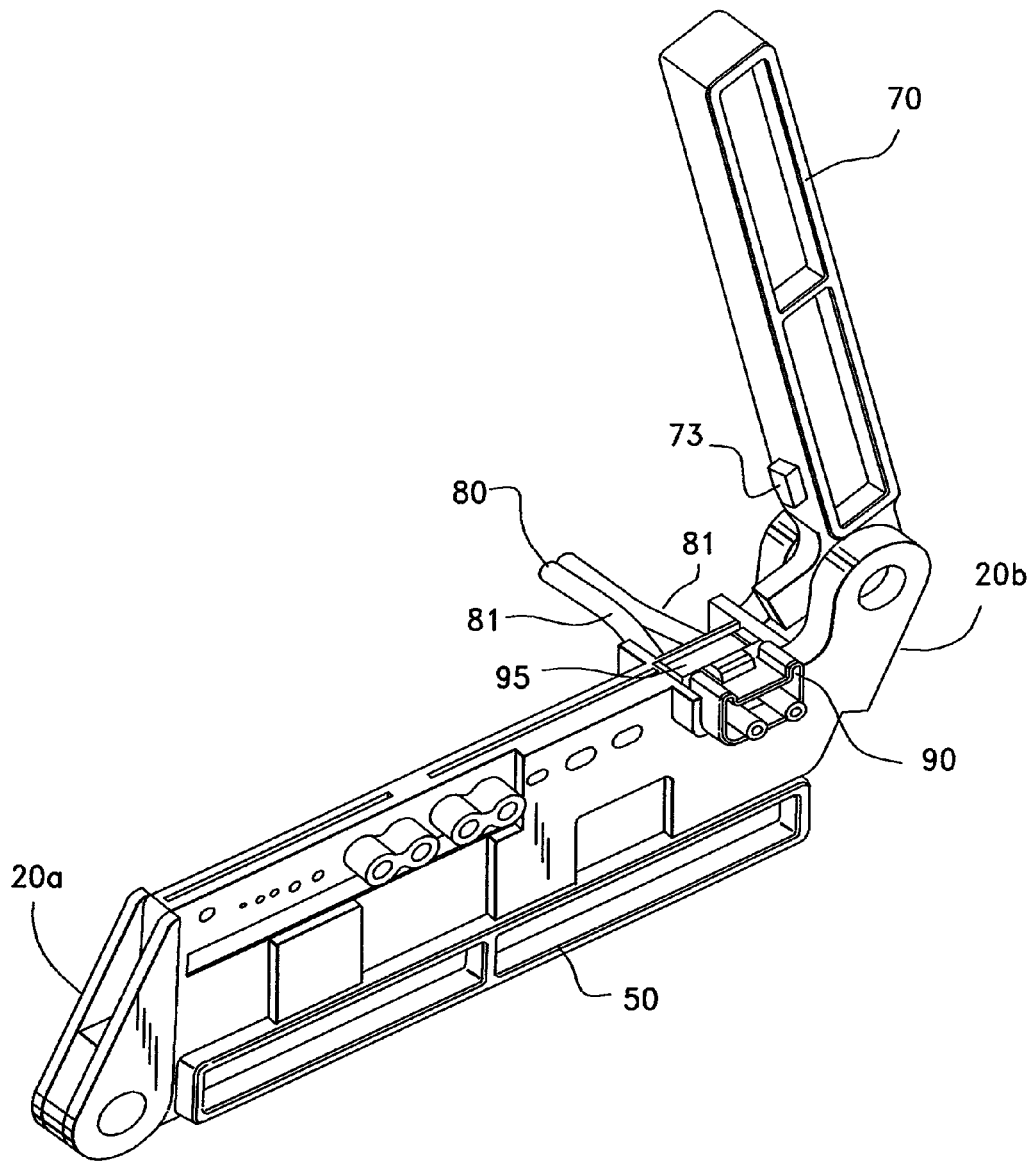
FIG. 5 is a perspective view of the hand tool of FIG. 1, but with the hand tool turned over and with a connector mounted in the hand tool and POF inserted into the connector and ready for securing such POF to the connector.
Figure 6:
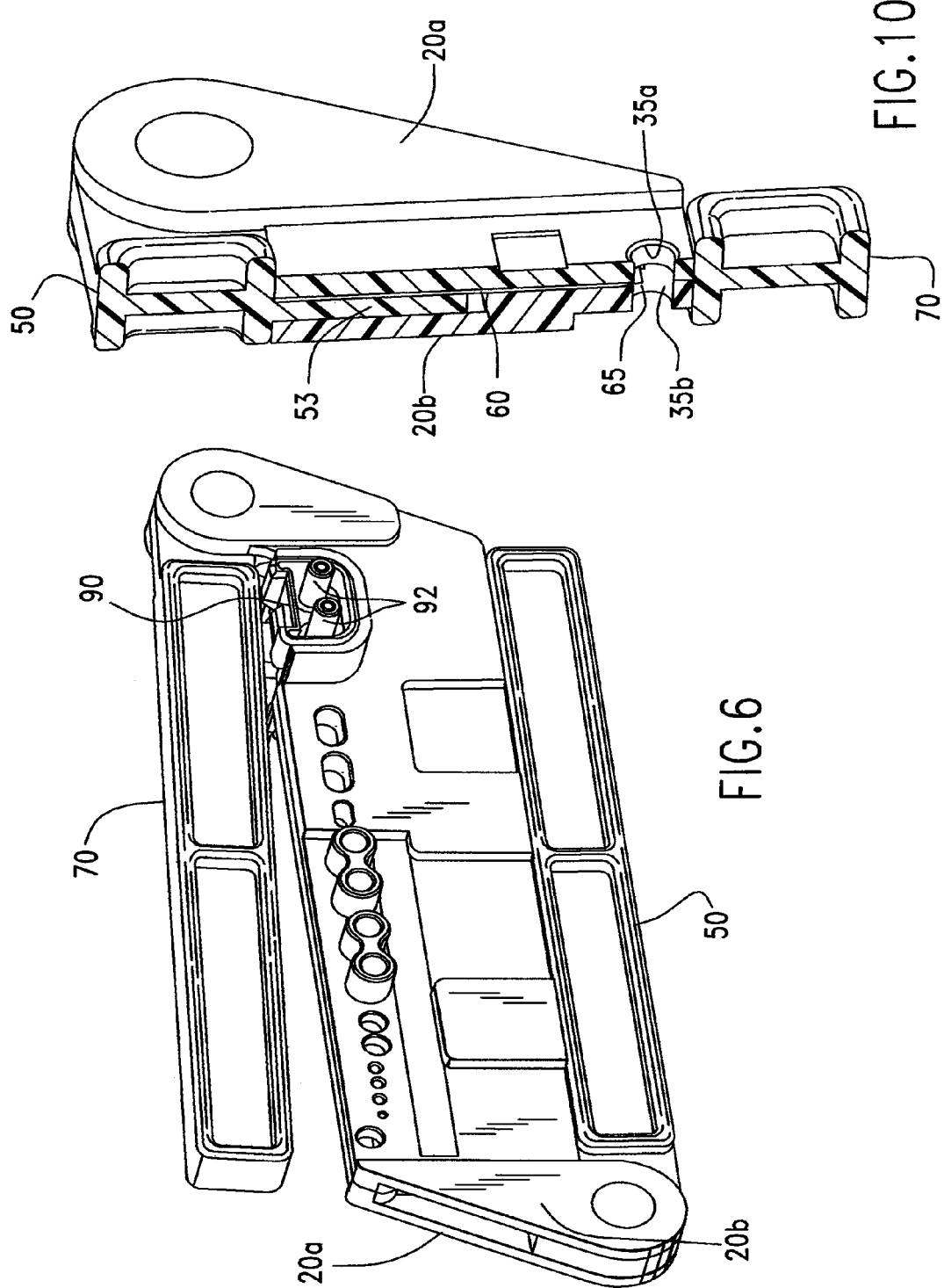
FIG. 6 is a perspective view similar to that of FIG. 5, but with the press arm in position immediately prior to securing the POF to the connector.
Figure 7:
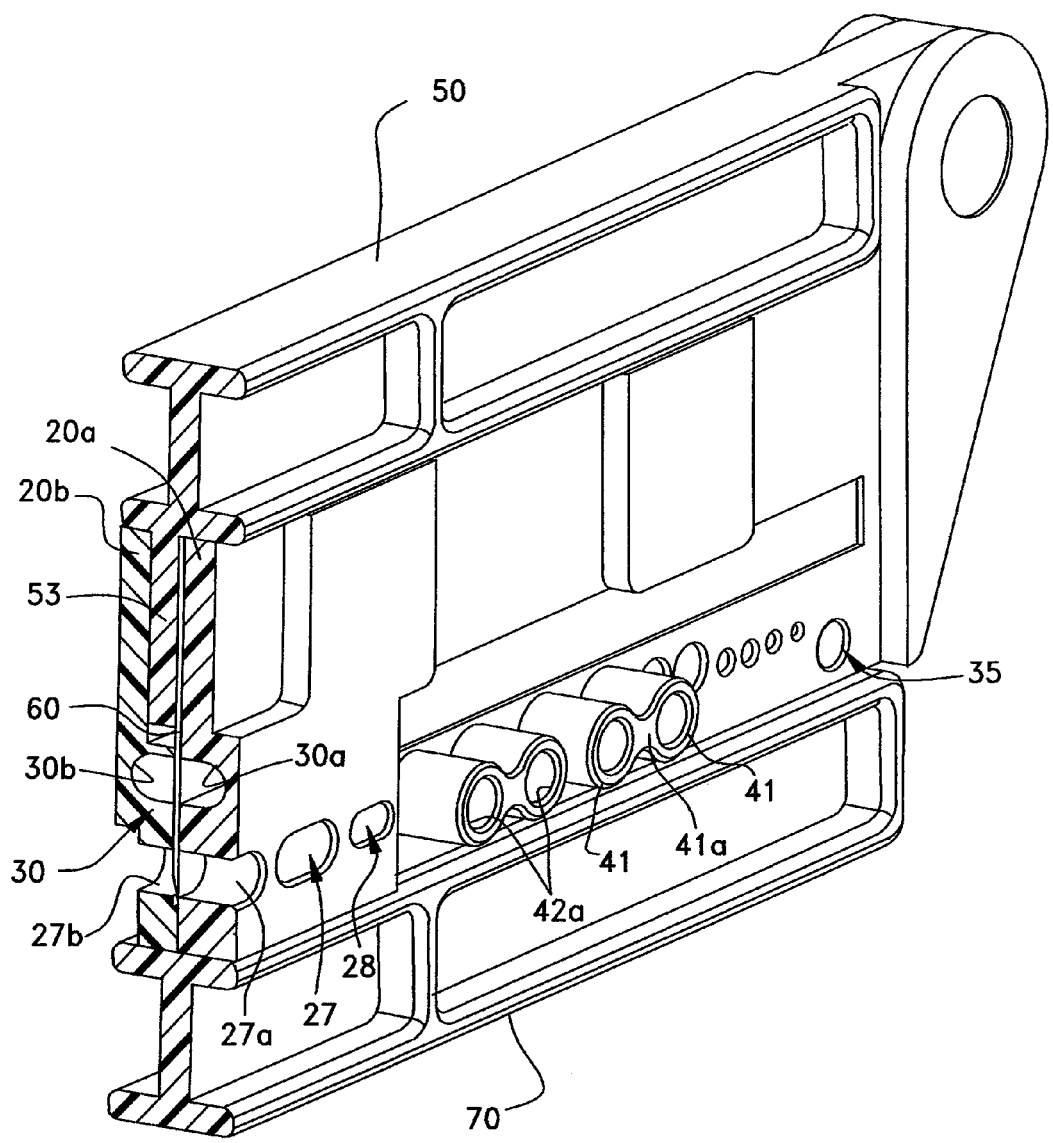
FIG. 7 is a cross-section of the hand tool of FIG. 1 taken generally along Line 7-7 of FIG. 1, illustrating the interaction between the cutting blade and the splitting aperture as well as the cutting blade and the cutting aperture.
Figure 8:
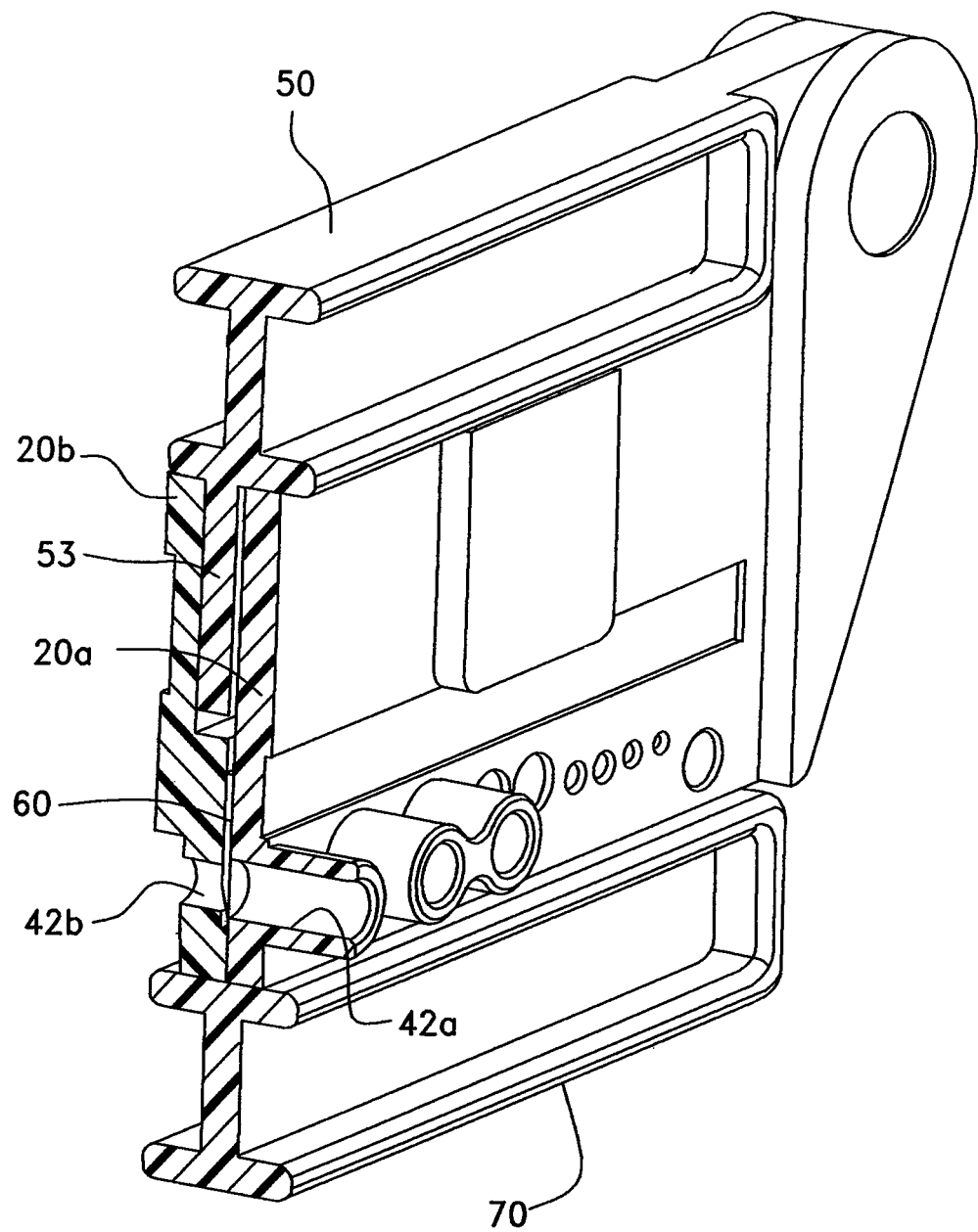
FIG. 8 is a cross-section of the hand tool of FIG. 1 taken generally along line 8-8 of FIG. 1, illustrating the interaction between the cutting blade and the cleaving aperture.

Each of the front and rear body halves 20a, 20b is also provided with a stripping port 35 formed by aperture or bore 35a in front body half 20a and aperture or bore 35b in rear body half 20b. It should be noted that stripping port 35 is positioned substantially below the other ports 31, 32, 33, 34 as best seen in FIG. 3. As a result, the cutting blade 60 does not fully extend down the entire vertical length of port 35, but merely partway. Accordingly, moving the cutting blade to the cutting position will only cut the outer jacket 83 of POF 81 inserted therein in order to facilitate stripping or removal of the outer jacket layer.

Body 20 includes a connector receiving receptacle 36 dimensioned to receive and secure therein an appropriately shaped connector 90. Front body half 20a includes a portion 36a of such receptacle 36 and rear body half 20b includes the other portion 36b which is similarly shaped to portion 36a. Portion 36b, however, includes a pair of arms 37 with projections 38 extending from opposite sides in order to grip and retain connector 90 therein. The portion 36b further includes a locating projection 39 extending downwardly from the top surface of portion 36b and interacting with a comparably shaped and sized recess in the connector 90 in order to properly position the connector along the axis of the fiber within receptacle 36.

Pairs of cleaving or termination ports 40 are provided and include two cylindrical projections 41 connected by a web 41a to define a somewhat "binocular-shaped" structure extending out from the outer surface of front body half 20a. Each projection includes aperture or bore 42a that extends through front body half 20a. Aperture 42a is dimensioned and shaped so as to receive and relatively precisely locate ferrule 92 of a connector 90 into which a length of POF 82 has been secured. The aperture 42a is sized so as to be large enough to permit the ferrule 92 of the connector to be inserted into cleaving port 40 during the cleaving process (FIG. 11).

The ferrule 92 includes a central bore or aperture 94 into which the POF is inserted. The aperture of the ferrule is sized so as to have a slightly larger inside diameter than the outside diameter of the POF 82 to be inserted therein. It is desirable that the aperture 94 of the ferrule has an inside diameter that ranges from the diameter of the POF to an inside diameter five percent (5%) larger than the diameter of the POF.

The pairs of projections 41 are connected by a web 41a in order to add strength and rigidity to the projections. The length or distance that the projections 41 extend from the front body half 20a is established so that the end of the ferrule 92 at which the POF will be cleaved is precisely located immediately adjacent the cutting plane of cutting blade 60.

The rear body half 20b includes apertures or bores 42b aligned with the apertures 42a of front body half 20a, but the apertures 42b are of a different diameter than apertures 42a. More specifically, apertures 42b are smaller in diameter than apertures 42a, but larger than the aperture 94 of the ferrule of the connector within which the length of POF 82 will be secured. As with the apertures 31b, 32b, 33b, 34b on rear housing half 20b described above, apertures 42b are also sized so as to be large enough to permit movement of a length of POF 82 inserted into cleaving port 40 during the cleaving process. Aperture 42b preferably has an inside diameter that is two times (2×) larger than the diameter of the POF to be cleaved in cleaving port 40 in order to permit the POF to rotate or deflect in an unimpeded manner.

Figure 12:
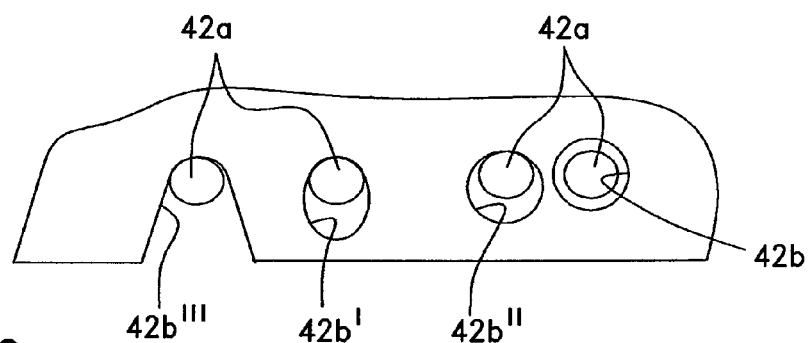
FIG. 12 is a somewhat schematic view of various options for rear housing half clearance apertures associated with a cleaving port.

Referring to FIG. 12, it is not necessary that the apertures 42b be circular and could be oval-shaped 42b' with the elongation being vertical or generally along the path of travel of cutting blade 60. Furthermore, the apertures 42b do not need to extend above a top surface of aperture 42a as the rear housing half apertures 42b are enlarged to provide clearance and permit movement of the POF during cleaving and such movement would be downward rather than upward. As such, aperture 42b" could also be circular with the top surface thereof aligned with the top surface of aperture 42a. In the alternative, as with respect to cleaving ports 31, 32, 33, 34, it is possible to enlarge or eliminate portions of the rear housing half 20b to create the desired clearance 42b", but this may be undesirable for safety reasons.

During the cleaving process, cutting blade 60 engages the POF 82 at a location immediately adjacent the inner edge of front housing half 20b and is supported by and within the bore 94 of the connector ferrule 92. When the cutting blade 60 engages the POF, the free end 85 of the POF 82 within rear housing half apertures 42b moves downward. Such downward movement is exaggerated for clarity in FIG. 11. It is important that the free end 85 of the POF 82 be permitted to rotate or deflect downward out of the axis extending through the ferrule 92 by at least ten degrees although rotation or deflection of a lesser amount may be acceptable provided that such rotation or deflection unimpeded. This motion of the free end of the POF increases the quality of the cleaved end of the POF and assists in creating the desired optical finish.

Blade carrier arm 50 is an elongated member having a handle portion 51 and a pair of cylindrical projections 52 that act as an axle that engages apertures 23a and 23b of body 20 and permits rotation of carrier arm 50. A blade carrying projection 53 extends downward slightly offset from the lateral centerline 54 (FIG. 9) of arm 50 and is substantially vertical. However, as described below, it may be desirable to angle projection 53 slightly or provide an angled surface to which cutting blade 60 is mounted. Projection 53 includes a pair of semi-circular blade retaining projections 55 that engage oval opening 61 of cutting blade 60 in a press fit manner in order to secure the blade to carrier arm 50. Through the rotation of carrier arm 50, blade 60 moves through slot 25 passing across and perpendicular to the axes that extend through apertures 27, 28, 31, 32, 33, 34, 40 to cut a POF inserted therein and along or parallel to the axis of oval-shaped channel 30.

Cutting blade 60 is a generally rectangular, hardened steel, chisel-cut razor blade, with an elongated oval-shaped opening 61 therein. Cutting blade 60 includes a chisel point at its lower or cutting edge 62 whereby a first or front surface 63 of blade 60 facing front body half 20a is longer than the second or rear surface 64 of the blade facing rear body half 20b. This structure creates a large sloped cutting surface 65 (FIGS. 9-9A) whereby the cutting edge of the blade may be positioned very close to the inner wall of front body half 20a. In order to achieve an acceptable optical finish (i.e., loss of less than 1 dB) on the end surface of the POF 82 as a result of the cleaving process, the cutting surface 65 should be honed to a "mirrored" edge. An appropriate measure of a "mirrored" edge that is sufficiently honed in order to achieve the desired optical finish as described herein would be the absence of visible defects at a particular magnification. Visible defects include chips in the cutting surface and measurable nicks in the edge of the blade. A cutting surface would be sufficiently honed if there are no visible defects when viewed under a microscope at 100 times (100×) magnification. It is believed that the cutting surface would be sufficiently honed if no visible defects were present when viewed under a microscope at 50 times (50×) magnification; however, a cutting surface would not be sufficiently honed if the measurement were at 20 times (20×) magnification.

Figures 9, 9A:
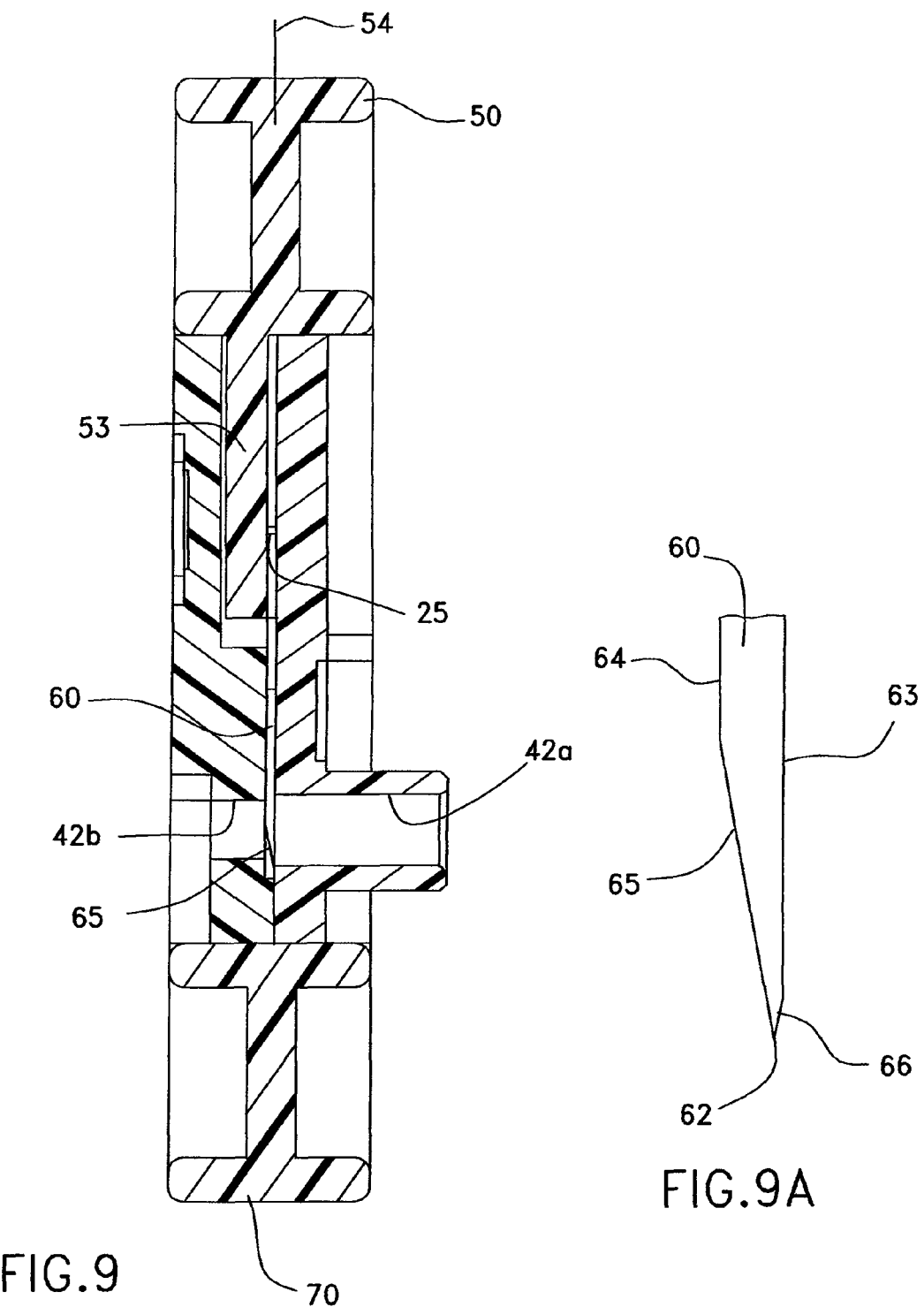
FIG. 9 is an end view of the cross-section of FIG. 8.
FIG. 9A is an enlarged view of the end of the cutting blade of FIG. 9.

Referring to FIG. 9A, it should be noted that while a chisel cut blade 60 is typically described as only having a single sloped surface 65, upon close inspection, it can be seen that a short sloped surface 66 extends upward from cutting edge 62 towards front surface 63 of blade 60. This is provided so that the cutting edge has additional strength and is thus less prone to wear and damage. However, this short sloped surface 66 may cause the blade to cleave the POF 82 at an angle other than 90 degrees to the axis of the POF which will result in undesired signal loss or increased wear during mating of two cleaved POF connectors to each other which will degrade the optical finish of the ends of the POF. It is believed that a change in the angle at which the blade carrying projection supports the cutting blade 60 could be utilized in order to eliminate the undesired angled end surface created during the cleaving process. For example, rotating the cutting blade 60 by approximately 8 degrees will result in short sloped surface 66 being approximately vertical and it is believed that such blade rotation will eliminate or reduce any angle of the finished end surface from being perpendicular to the axis of the POF.

Figure 4:
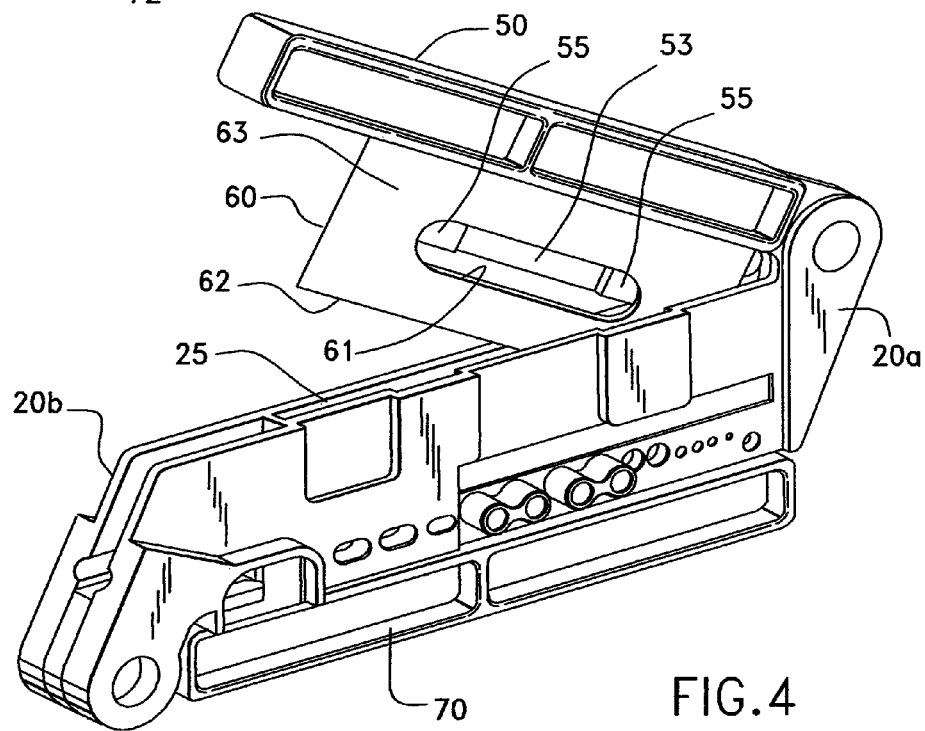
FIG. 4 is a perspective view similar to that of FIG. 3, but with the cutting arm rotated beyond its open position to further illustrate the structure of the cutting arm and the cutting blade and the interaction therebetween.

The blade carrier arm 50 together with blade 60 mounted thereto are only capable of very limited rotational movement for safety reasons as best seen in FIG. 3. More specifically, the blade carrier arm 50 and blade 60 may only rotate approximately eight degrees so that a user's fingers are protected at all times from the cutting edge 62 of blade 60. This limited rotation is achieved by providing an engagement surface 56 on cutting arm 50 that engages a blocking surface 45 on front and rear body halves 20a, 20b (FIG. 3). Referring to FIG. 4, blade carrier arm 50 and blade 60 have been rotated beyond the eight degree limit of rotation in order to facilitate a better understanding of the structure of the embodiment. Such position is not possible under normal operation of the embodiment unless the safety features have been removed.

Press arm 70 is a generally elongated member having a handle portion 71 and a pair of cylindrical projections 72 extending from opposite sides of the press arm that act as an axle and engage apertures 24a, 24b of body 20 to permit rotation of press arm 70. A press fit projection 73 is provided adjacent the cylindrical projections 72 and extend toward body 20 when arm 70 is in its closed position. Press fit projection 73 is used to press locking clip 95 associated with the connector 90 to secure the POF 80 within the connector. Unlike blade carrier arm 50, press arm 70 is capable of rotating greater than one hundred eighty degrees in order to facilitate insertion of the connector 90 into receptacle 36 within body 20.

The termination process to be used with hand tool 15 will be described below in connection with the termination of an SMI connector 90. Blade carrier arm 50 is initially positioned in its open position as shown in FIG. 3 and a duplex POF cable 80 is inserted into cutting port 27 in order to cut the cable roughly to length by moving the cutting arm to its closed position as shown in FIG. 1 so that the cutting edge 62 of blade 60 fully extends past apertures 27a, 27b of cutting port 27. The blade carrier arm 50 is then returned to its open position and the end of the duplex cable 80 is inserted into oval channel 30 until the end of the cable reaches the innermost end 30c of the channel. Blade carrier arm 50 is then rotated to its closed position so that the cutting blade moves downward and cuts the web 84 between the individual fibers 81 of the duplex POF cable 80. The end of the duplex cable is then removed from the aperture 30 and the blade carrier arm 50 is again moved to its open position. One of the individual fibers 81 of the split end of the duplex POF is inserted into cable stripping port 35 and the blade carrier arm 50 is again moved to its closed position. Because the blade 60 only extends partway into cable stripping port 35, only the outer jacket 83 of the POF 81 is engaged or cut by blade 60. The individual fiber 81 is then rotated three hundred sixty degrees so that the outer sheath of jacket 83 of the individual fiber 81 may be removed from an end portion of the POF leaving an exposed length 82 of the POF. This process is then repeated for the second individual fiber of the duplex POF cable.

Hand tool 15 is then turned over or rotated one hundred eighty degrees so that the press arm 70 is on top of the body 20 as shown in FIG. 3. An SMI connector 90 is then inserted into receptacle 36 whereby projections 38 engage and grip sides of the connector 90 and axial locating projection 39 engages a recess (not shown) in connector 90 in order to properly position the connector along the axis of the fiber and generally perpendicular to the longitudinal axis of hand tool 15. The previously split individual ends of the duplex POF cable 80 are inserted into the connector with a length of approximately 5-10 mm of the stripped POF 82 extending past the end of each ferrule 92 of the connector 90. The length of stripped POF 82 that extends past the end of ferrule 92 compared to the terminated or cleaved end of ferrule 92 can be seen in FIG. 14. A metal stopper or clip 95 is then inserted into the connector and the press arm 70 is rotated from its open position to its closed position whereby the projection 73 engages the metal clip 95 and forces it downward into the connector 90 in order to secure the POF within the connector.

The hand tool 15 is then turned over or rotated one hundred eighty degrees so that the blade carrier arm 50 is again on top as shown in FIG. 1. The blade carrier arm 50 is moved to its open position and the connector with the duplex POF cable 80 secured therein is then slid onto projections 41 with the ferrules 92 of the connector 90 sliding into the apertures 42a. The stripped free ends 82 of the POF cable extend across channel 26 of body 20 and into apertures 42b in order to loosely support the ends of the POF cable. Blade carrier arm 50 is then moved from its open to its closed position in order to cleave or smoothly cut the ends of the POF cable as close to the ends of the ferrules 92 as possible and with a high-quality optical finish. As cutting blade 60 engages the POF cable, the operative sections of the cable will be supported within ferrules 92 and the ends deflect downward. As used herein, the section of POF that is stripped of jacket 83 and extends from ferrule 92 to cutting edge 62 of cutting blade 60 may be referred to as the operative section of the POF and the section of POF that is stripped of jacket and extends from the cutting blade to the end of the stripped POF 82 (prior to cleaving) may be referred to as the termination end of the POF. It is desirable that the termination end be able to deflect at least ten degrees below the axis of the cleaving port. It has been found that using the hand tool and techniques described herein have resulted in a finished termination comparable in quality to that of well polished POF ends.

While a preferred embodiment of the Present Application is shown and described, it is envisioned that those skilled in the art may devise various modifications without departing from the spirit and scope of the foregoing Description and the appended Claims.

What is claimed is:

1. A tool for cleaving a plastic optical fiber, the plastic optical fiber including an operative section and a termination end section, the tool comprising:

a body, the body including an insertion face and a termination face opposite the insertion face;

a cleaving port, the cleaving port including a cleaving aperture at the insertion face of the body and through which the termination end section is inserted and in which the operative section is positioned upon inserting the plastic optical fiber into the tool, the operative section defining a cleaving axis when disposed in the tool;

a cutting blade mounted on a cutting arm having a cutting edge, the cutting blade being moveable along a cutting path between a first operative position, at which the cutting edge is spaced from the cleaving axis, and a second operative position, at which the cutting edge intersects the cleaving axis, to cleave the plastic optical fiber inserted into the cleaving aperture at a location between the operative section and the termination end section in order to cut the plastic optical fiber and create an optical finish on an end surface of the operative section;

a clearance region at the termination face of the body generally aligned with the cleaving aperture and in which the termination end section is inserted upon inserting the plastic optical fiber into the tool, the clearance region defining an open space intersecting with the cleaving axis and a deflection space into which the termination end section may deflect upon engagement of the cutting blade with the plastic optical fiber; and a press arm mounted on the body for movement between the first and second operative positions, the press arm including a press section for securing a portion of the plastic optical fiber to a connector.

2. The tool of claim 1, wherein the tool is a manually manipulatable hand tool and the cutting blade has a chisel cut cutting edge.

3. The tool of claim 1, wherein the cleaving aperture extends through the insertion face and along the cleaving axis, and the operative section of the plastic optical fiber is located within a ferrule of the connector, the cleaving aperture being configured to receive the ferrule therein.

4. The tool of claim 3, wherein the tool further includes a locating projection extending from the tool adjacent the cleaving port for engaging a portion of the connector to properly position the connector along the cleaving axis prior to cleaving.

5. The tool of claim 4, wherein the cleaving aperture extends through the locating projection, and the locating projection engages a mating portion of the connector.

6. The tool of claim 5, further including a pair of cleaving ports, each cleaving port including locating projections, the locating projections of each cleaving port being interconnected.

7. The tool of claim 1, wherein the body is generally elongated and has a longitudinal axis, and the cutting blade is generally planar and mounted to a moveable, elongated arm extending generally parallel to the longitudinal axis.

8. The tool of claim 7, wherein the cutting path is planar and the elongated arm is rotatably mounted on the body and rotates with the cutting blade in order to move the cutting blade from the first operative position to the second operative position along a cutting plane.

9. The tool of claim 8, wherein the elongated arm includes a support member for positioning the cutting blade at a desired, predetermined angle relative to the cutting path.

10. The tool of claim 9, wherein cutting blade is coplanar with the cutting plane.

11. The tool of claim 9, wherein the predetermined angle is approximately 6° with an upper surface of the cutting blade tilted away from the insertion face.

12. The tool of claim 7, further including a plurality of cleaving ports spaced lengthwise along the body, each cleaving port including a bore through the insertion face, the bores of some of the cleaving ports being identically sized.

13. The tool of claim 1, wherein the plastic optical fiber has a predetermined diameter, and the cleaving aperture includes a bore through the insertion face and along the cleaving axis, the bore being larger than the outer diameter of the plastic optical fiber, but not exceeding 5% of the outer diameter.

14. The tool of claim 1, wherein the clearance region permits the termination end section to deflect at least approximately 10° from the cleaving axis during the process of cleaving the plastic optical fiber.

15. The tool of claim 1, wherein the cutting blade includes a honed cutting surface.

16. The tool of claim 15, wherein the cutting surface is honed such that no visible defects are present under approximately 100× magnification.

17. The tool of claim 15, wherein the cutting surface is honed such that no visible defects are present under approximately 50× magnification.

18. A manually-manipulatable hand tool for a plastic optical fiber, the plastic optical fiber including a diameter, an operative section and a termination end section, the manually-manipulatable hand tool comprising:

an elongated body defining a longitudinal axis and having first and second sidewalls, a central elongated blade receiving recess between the sidewalls and at least one cleaving aperture extending through the first sidewall and through which the termination end section of the plastic optical fiber is inserted and in which the operative section is positioned upon inserting the plastic optical fiber into the manually-manipulatable hand tool, the operative section in the tool defining a cleaving axis, a clearance region in the second sidewall generally aligned with the cleaving aperture and including an open space intersecting with the cleaving axis and a deflection space into which the termination end section may deflect, the termination end section being positioned in the clearance region upon insertion of the plastic optical fiber into the manually-manipulatable tool;

a cutting arm having a blade operatively connected thereto, the cutting arm being mounted on the body for movement between a first operative open position, at which the plastic optical fiber may be inserted into the cleaving aperture, and a second operative closed position, at which the blade is positioned within the recess and extends across the cleaving aperture, so that the plastic optical fiber inserted into the bore is cleaved between the operative section and the termination end section to create a finished optical surface on an end of the operative section in response to moving the cutting arm from the first operative open position to the second operative closed position; and a press arm mounted on the body for movement between the first and second operative positions, the press arm including a press section for securing a portion of the plastic optical fiber to a connector.

19. The manually-manipulatable hand tool of claim 18, further including at least one mating projection extending from the first sidewall for mating with a mating face of the connector to accurately position the operative section positioned in the cleaving aperture.

20. The manually-manipulatable hand tool of claim 18, wherein the cutting arm is rotatably mounted on the body.

21. The manually-manipulatable hand tool of claim 18, further including a cutting section with an oval-shaped aperture extending generally perpendicular to the longitudinal axis and through the first and second sidewalls, the blade receiving recess extending across the aperture to cut simultaneously two plastic optical fibers in response to movement of the cutting arm from the first operative open position to the second operative closed position.

22. The manually-manipulatable hand tool of claim 18, further including a splitting section for splitting a pair of plastic optical fibers connected by a web of insulative material in response to movement of the cutting arm from the first operative open position to the second operative closed position.

23. The manually-manipulatable hand tool of claim 22, wherein the splitting section includes an oval shaped channel extending generally parallel to the longitudinal axis.

24. The manually-manipulatable hand tool of claim 18, further including a stripping section for stripping an outer jacket from the plastic optical fiber in response to movement of the cutting arm from the first operative open position to the second operative closed position.

25. The manually-manipulatable hand tool of claim 19, wherein the stripping section includes an aperture extending generally perpendicular to the longitudinal axis and through the first and second sidewalls and the cutting blade extending only partially across the hole when the cutting arm is in the second operative closed position to cut only the outer jacket of the plastic optical fiber.

26. The manually-manipulatable hand tool of claim 19, wherein the cutting arm and the press arm are both rotatably mounted on the body.

27. The manually-manipulatable hand tool of claim 19, wherein the cutting arm and the press arm are mounted at opposite ends of the body.

28. A method of cleaving a plastic optical fiber, the method comprising:
    providing a duplex plastic optical fiber, the duplex optical fiber including first and second plastic optical fibers, each plastic optical fiber having a diameter, an operative section and a termination end section;
    providing a tool having a cutting blade thereon configured for movement along a cutting path between first and second operative positions;
    cutting the duplex plastic optical fiber to a predetermined length;
    stripping an outer buffer layer of each plastic optical fiber;
    providing a connector having a mating face and first and second ferrules, each ferrule including an aperture;
    inserting the termination end section of each plastic optical fiber into the connector through the first and second ferrules to an operative position such that the operative section of each plastic optical fiber is positioned within its ferrule and the termination end section of each plastic optical fiber extends from its ferrule;
    securing the operative sections of each plastic optical fiber within the ferrules, each operative section being positioned along a cleaving axis;
    positioning the connector relative to the tool such that ends of the ferrules are adjacent the cutting path and the termination end sections are within a clearance region of the tool, the clearance region defining an open space along each respective cleaving axis and a deflection space adjacent the open space; and
    moving the cutting blade from the first operative position spaced from the cleaving axes to the second operative position intersecting the cleaving axes to engage each plastic optical fiber to cleave the plastic optical fibers adjacent the ends of the ferrules and create an optical finish on an end surface of the operative sections of the plastic optical fibers.

29. The method of claim 28, wherein the step of cutting the duplex plastic optical fiber to a predetermined length includes inserting the duplex plastic optical fiber into a first oval shaped hole in the tool and moving the cutting blade from the first operative position to the second operative position.

30. The method of claim 29, wherein the step of cutting the web of material of the duplex plastic optical fiber to separate the individual plastic optical fibers includes inserting the duplex plastic optical fiber into a second oval shaped hole in the tool and moving the cutting blade from the first operative position to the second operative position.

31. The method of claim 28, wherein the step of stripping the outer buffer layer of each plastic optical fiber includes inserting the operative section and the termination end section of each plastic optical fiber into a stripping hole in the tool and moving the cutting blade from the first operative position to the second operative position and rotating each plastic optical fiber.

* * * * *